J. H. TAYLOR.
PROCESS OF MAKING WELDED PIPE.
APPLICATION FILED NOV. 1, 1907.
916,501.
Patented Mar. 30, 1909.
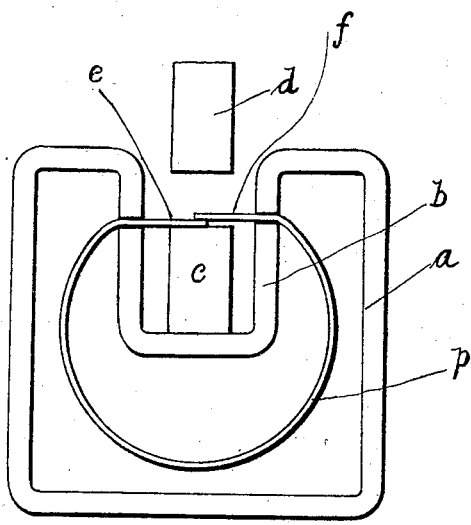
Witnesses
George C. Higham.
Leonard W. Novander.
Inventor
James Hall Taylor
By Bowen + Williams
Attorneys

UNITED STATES PATENT OFFICE.

JAMES HALL TAYLOR, OF CHICAGO, ILLINOIS.

PROCESS OF MAKING WELDED PIPE.

No. 916,501.　　　　　Specification of Letters Patent.　　　Patented March 30, 1909.

Application filed November 1, 1907. Serial No. 400,296.

*To all whom it may concern:*

Be it known that I, JAMES HALL TAYLOR, citizen of the United States, residing at Chicago, in the county of Cook and State of Illinois, have invented a certain new and useful Improvement in Processes of Making Welded Pipe, of which the following is a full, clear, concise, and exact description, reference being had to the accompanying drawings, forming a part of this specification.

My invention relates to the manufacture of pipe, its object being to provide an improved process of making welded pipe.

The usual practice heretofore in making welded pipe from sheet material has been to roll a blank in suitable dimensions into cylindrical form, with the edge abutting or overlapping, to be subsequently heated and welded together. In this process, during the rolling of the blank the curvature is carried throughout, the edge areas of the blank being also curved. This requires that the dies and hammer also have a curvature to correspond to the curvature of the edge areas. For different diameter pipes, it is therefore necessary to use different dies and hammers. It is also difficult to clamp the rolled blank to hold it in position for welding.

In accordance with my invention, the blank for the pipe is rolled into substantially cylindrical form, but the edge areas are not rolled but are maintained flat, so that when the rolled blank is in position for welding, the edge areas are in parallel flat planes with the edges overlapping. The same die and hammer can now be used for welding pipes of any diameter. Clamping mechanism can also be more readily and efficiently applied to the flat section. Warping and distortion is also resisted and overcome to greater extent, as the strain caused by the heat can be more readily resisted by the flat sections than by curved edge sections.

In the accompanying drawing I have shown diagrammatically the apparatus for carrying out my process.

$a$ represents a U-shaped frame, whose upright limbs extend inwardly and downwardly at their ends to form outer clamping jaws. The smaller U-shaped frame $b$ is shown, whose limbs form the inner clamping jaws for coöperating with the outer jaws.

$c$ represents an anvil exposed within the inner jaw of frame $b$, while $d$ represents a hammer, which may be reciprocated in any manner.

The pipe $p$ is first rolled into substantially cylindrical form from the blank; the edge sections $e$ and $f$, however, are not given curvature, but remain flat, so that after rolling they will lie in parallel flat planes. The rolled form is then inserted between the outer and inner jaw members and between the anvil and hammer. The jaw members are brought into clamping engagement in any manner with the outer side of the edge sections, then held in their parallel horizontal arrangement, as shown, with the ends overlapping the required distance and disposed between the anvil and hammer. The ends are then suitably heated and the hammer operated to weld the ends together. After a length of pipe has been thus welded, it is withdrawn from the clamping frames and passed over a form which causes the flat ends to be rounded and the entire pipe given a true cylindrical form.

It will be seen that in accordance with this process, the same hammer and the same die will serve for welding pipes of different diameters. The clamping means would also serve for all diameters of pipes, and can be more readily applied to the flat edge section shown. Strains caused in the ends by heat are more readily resisted and overcome, as the direction of these strains is in straight lines and at right angles to the jaw ends.

Different apparatus from that shown could, of course, be used to carry out my process, the main feature being the provision of flat surfaces for the clamping and welding devices, and the welding of the ends when in such flat shape, and then expanding the welded pipe to cause its cross-section to be cylindrical.

Having thus described my invention, I desire to secure the following claims by Letters Patent:

1. The process of making welded pipe which consists in first forming a blank into approximately cylindrical form with flat edge sections, securing the pipe between clamping jaws which engage at the outer edge of the flat sections to hold said sections in parallel relation with each other and with their edges overlapping, then heating the overlapping edges and welding them together, and then withdrawing the welded pipe from the clamping jaws and forming the pipe into cylindrical form.

2. The process of making welded pipe which consists in first forming a pipe from sheet material into approximately cylindrical form with flat edge sections, clamping the pipe thus formed so that the flat edge sections will be parallel to each other and the edges overlapping, then heating and welding the overlapping edges together, and then forming the pipe into cylindrical form.

In witness whereof, I hereunto subscribe my name this 30th day of October A. D., 1907.

JAMES HALL TAYLOR.

Witnesses:
 CHARLES J. SCHMIDT,
 GEORGE E. HIGHAM.